(12) United States Patent
Inoue et al.

(10) Patent No.: US 6,842,310 B2
(45) Date of Patent: Jan. 11, 2005

(54) ROTARY HEAD DRUM DEVICE HAVING HOLLOW PORTIONS IN BONDING SURFACES FOR ADHESIVELY BONDING ROTARY TRANSFORMERS THERETO AND METHOD FOR MANUFACTURING THE SAME

(75) Inventors: Hiroshi Inoue, Katano (JP); Masashi Omura, Kobe (JP); Hiroshi Kanchiku, Nara (JP)

(73) Assignee: Matsushita Electric Industrial Co., Ltd. (JP)

( * ) Notice: Subject to any disclaimer, the term of this patent is extended or adjusted under 35 U.S.C. 154(b) by 154 days.

(21) Appl. No.: 10/372,962

(22) Filed: Feb. 26, 2003

(65) Prior Publication Data

US 2003/0161075 A1 Aug. 28, 2003

(30) Foreign Application Priority Data

Feb. 28, 2002 (JP) ...................................... 2002-052752

(51) Int. Cl.[7] .............................................. G11B 5/52
(52) U.S. Cl. .................................................. 360/281.1
(58) Field of Search ............................ 360/281.1–281.8

(56) References Cited

U.S. PATENT DOCUMENTS 5,687,043 A * 11/1997 Cho ......................... 360/281.3

* cited by examiner

Primary Examiner—A. J. Heinz
(74) Attorney, Agent, or Firm—Parkhurst & Wendel, L.L.P.

(57) ABSTRACT

According to the present invention, a hollowed portion is formed on a lower bonded surface of a rotary drum to which a rotation-side rotary transformer is bonded, and a hollowed portion is formed on an upper bonded surface of the fixed drum to which a fixation-side rotary transformer is bonded. Thus, excessive adhesive is absorbed by the hollowed portions and adhesive layers do not have uneven thicknesses, thereby securing surface runout accuracies of the rotary transformers. Further, since an adhesive is applied to the outer peripheral side of the hollowed portion of the rotary drum, the adhesive does not flow into ball bearings located on the inner peripheral side.

6 Claims, 11 Drawing Sheets

ROTARY HEAD DRUM DEVICE HAVING HOLLOW PORTIONS IN BONDING SURFACES FOR ADHESIVELY BONDING ROTARY TRANSFORMERS THERETO AND METHOD FOR MANUFACTURING THE SAME

FIELD OF THE INVENTION

The present invention relates to a rotary head drum device which can be used for a video tape recorder and so on.

BACKGROUND OF THE INVENTION

A conventional rotary head drum device used for a video tape recorder is configured as shown in FIG. 11.

Reference numeral 1 denotes a fixed drum for guiding a magnetic tape (not shown), reference numeral 2 denotes a shaft which is coaxially fixed on the fixed drum 1, reference numeral 3 denotes a rotary drum having a magnetic head 4 on the lower surface, reference numeral 5 denotes ball bearings located on the upper part and the lower part of the rotary drum 3, reference numeral 6 denotes a rotation-side rotary transformer which is bonded to a lower bonded surface 3a of the rotary drum 3 via an adhesive and is electrically connected to the magnetic head 4. Reference numeral 7 denotes a fixation-side rotary transformer which is opposed to the lower surface of the rotation-side rotary transformer 6, is bonded to an upper bonded surface 1a of the fixed drum 1, and is electrically connected to an amplifying section (not shown).

Such a rotary head drum device is disclosed in Japanese Patent Publication No. 5-6244, for example.

As shown in FIG. 12, the rotation-side rotary transformer 6 is bonded to the rotary drum 3 and the fixation-side rotary transformer 7 is bonded to the fixed drum 1. Reference numeral 8 denotes an adhesive layer for boding the fixed drum. 1 and the fixation-side rotary transformer 7, reference numeral 9 denotes an adhesive layer for bonding the rotary drum 3 and the rotation-side rotary transformer 6.

Further, in order to obtain a signal transmission characteristic between the rotation-side rotary transformer 6 and the fixation-side rotary transformer 7, a gap A formed by the lower surface of the rotation-side rotary transformer 6 and the upper surface of the fixation-side rotary transformer 7 is generally set as an interval of several tens μm, and a surface runout accuracy is defined at A/2 or less for each of the rotation-side rotary transformer 6 with respect to the axis of rotation of the rotary drum 3 and the fixation-side rotary transformer 7 with respect to the axis of rotation of the shaft 2 fixed on the fixed drum 1.

In this rotary head drum device, information including an image and sound is recorded on a magnetic tape (not shown) through a path of the amplifying section (not shown)→the fixation-side rotary transformer 7→the rotation-side rotary transformer 6→the magnetic head 4 by rotating the rotary drum 3 including the magnetic head 4. Further, in the case of a recorded magnetic tape (not shown), recording information is reproduced through a path of the magnetic head 4→the rotation-side rotary transformer 6→the fixation-side rotary transformer 7→the amplifying section (not shown).

Such a rotary head drum device has been conventionally fabricated in the process below.

First, the magnetic head 4 is attached to the rotary drum 3, and the ball bearings 5 are located on the upper part and the lower part of the inner surface of the bearing hole of the rotary drum 3. Next, after an adhesive is applied to the lower bonded surface 3a of the rotary drum 3, the rotation-side rotary transformer 6 is fixed thereon by bonding with pressure.

Next, an adhesive is applied to the upper bonded surface 1a of the fixed drum 1, and the fixation-side rotary transformer 7 is fixed thereon by bonding with pressure.

Then, the shaft 2 fixed to the fixed drum 1 is inserted through the shaft hole of the ball bearings 5 provided for the rotary drum 3, the rotary drum 3 is fixed with respect to the axial direction of the shaft 2, the rotary drum 3 is mounted so as to rotate about the axis of the shaft 2, and thus the rotary head drum device is obtained.

However, the adhesive layer 8 or the adhesive layer 9 have an uneven thickness because an amount or an applied position of the adhesive between the rotary drum 3 and the rotation-side rotary transformer 6 varies and an amount or an applied position of the adhesive between the fixed drum 1 and the fixation-side rotary transformer 7 varies. Hence, it is difficult to set a surface runout accuracy of the rotation-side rotary transformer 6 and a surface runout accuracy of the fixation-side rotary transformer 7 at A/2 or less.

In this case, an amount of the adhesive is set at a specified amount with a certain permissible range.

Moreover, the ball bearings 5 are located on the inner peripheral side of the lower bonded surface 3a of the rotary drum 3, and excessive adhesive between the lower bonded surface 3a of the rotary drum 3 and the rotation-side rotary transformer 6 flows into the ball bearings 5 during bonding with pressure, resulting in an adverse effect on the ball bearings 5.

DISCLOSURE OF THE INVENTION

The present invention solves the above-described problem and has an object to provide a rotary head drum device whereby even when an adhesive for bonding a rotation-side rotary transformer and a fixation-side rotary transformer varies in amount or an applied position, a surface runout accuracy can be set at a stipulated value or less, excessive adhesive is less likely to flow into ball bearings, and thus recording and reproduction can be normally performed.

In order to attain the above object, in the rotary head drum device of the present invention, a hollowed portion is formed on a lower bonded surface of a rotary drum to which a rotation-side rotary transformer is bonded and a hollowed portion is formed on an upper bonded surface of a fixed drum to which a fixation-side rotary transformer is bonded.

With this configuration, it is possible to obtain a rotary head drum device in which even when an adhesive for bonding the rotation-side rotary transformer and the fixation-side rotary transformer varies in amount or an applied position, it is possible to obtain a surface runout accuracy of a stipulated value or less and normally perform recording and reproduction without permitting excessive adhesive to flow into ball bearings.

The rotary head drum device of the present invention, wherein a rotary drum having a magnetic head attached thereon is mounted to a shaft via ball bearings so as to rotate about the shaft with respect to the fixed drum, the shaft being supported by a fixed drum, a signal is transmitted and received to and from the magnetic head via a rotation-side rotary transformer and a fixation-side rotary transformer, the rotation-side rotary transformer being bonded and fixed on a lower bonded surface of the rotary drum, the fixation-side rotary transformer being bonded and fixed on an upper bonded surface of the fixed drum so as to oppose the rotation-side, rotary transformer, and hollowed portions are formed on the lower bonded surface and the upper bonded surface.

With this configuration, it is possible to obtain a rotary head drum device in which even when an adhesive for bonding the rotation-side rotary transformer and the fixation-side rotary transformer varies in amount or the applied position, a surface runout accuracy can be set at a stipulated value or less, excessive adhesive is less likely to flow into the ball bearings, and thus recording and reproduction can be normally performed.

Further, the hollowed portions formed on the lower adhesive surface and the upper adhesive surface are ring grooves surrounding the shaft. Even when the adhesive for bonding the rotation-side rotary transformer and the fixation-side rotary transformer varies in amount or an applied position, a surface runout accuracy can be set at a stipulated value or less.

Moreover, the ring grooves are 0.01 to 0.1 mm in depth.

Also, the ring groove formed on the rotary drum has an area set at 10 to 40% of that of the lower bonded surface, and the ring groove-formed on the fixed drum-has an area set at 10 to 40% of that of the upper bonded surface.

With this configuration, even when the adhesive for bonding the rotation-side rotary transformer and the fixation-side rotary transformer varies in amount or an applied position, a surface runout accuracy can be set at a stipulated value or less.

A method of manufacturing the rotary head drum device of the present invention, the rotary head drum being configured so that a rotary drum having a magnetic head attached thereon is mounted to a shaft via ball bearings so as to rotate about the shaft with respect to the fixed drum, the shaft being supported by a fixed drum, and a signal is transmitted and received to and from the magnetic head via a rotation-side rotary transformer and a fixation-side rotary transformer, the rotation-side rotary transformer being bonded and fixed on a lower bonded surface of the rotary drum, the fixation-side rotary transformer being bonded and fixed on an upper bonded surface of the fixed drum so as to oppose the rotation-side rotary transformer, wherein when an adhesive is applied to the rotary drum, the adhesive is applied to the outer peripheral side of a hollowed portion formed on the lower bonded surface of the rotary drum, and then, the rotation-side rotary transformer is press-bonded to the rotation drum.

With this configuration, it is possible to prevent excessive adhesive-from flowing into the ball bearings during bonding and pressuring.

Further, the method of manufacturing the rotary head drum, the drum being configured so that a rotary drum having a magnetic head attached thereon is mounted to a shaft via ball bearings so as to rotate about the shaft with respect to the fixed drum, the shaft being supported by a fixed drum, and a signal is transmitted and received to and from the magnetic head via the rotation-side rotary transformer and the fixation-side rotary transformer, the rotation-side rotary transformer being bonded and fixed on the lower bonded surface of the rotary drum, the fixation-side rotary transformer being bonded and fixed on the upper bonded surface of the fixed drum so as to oppose the rotation-side rotary transformer, wherein when an adhesive is applied to the fixed drum, the adhesive is applied to a hollowed portion formed substantially at the center of the upper bonded surface of the fixed drum, and then, the fixation-side rotary transformer is press-bonded to the fixed drum.

With this configuration, even when the adhesive for bonding the rotation-side rotary transformer and the fixation-side rotary transformer varies in amount or an applied position, a surface runout accuracy can be set at a stipulated value or less.

DESCRIPTION OF THE EMBODIMENT

Referring to FIGS. 1 to 10, the following will discuss an embodiment of the present invention.

Figure 1:
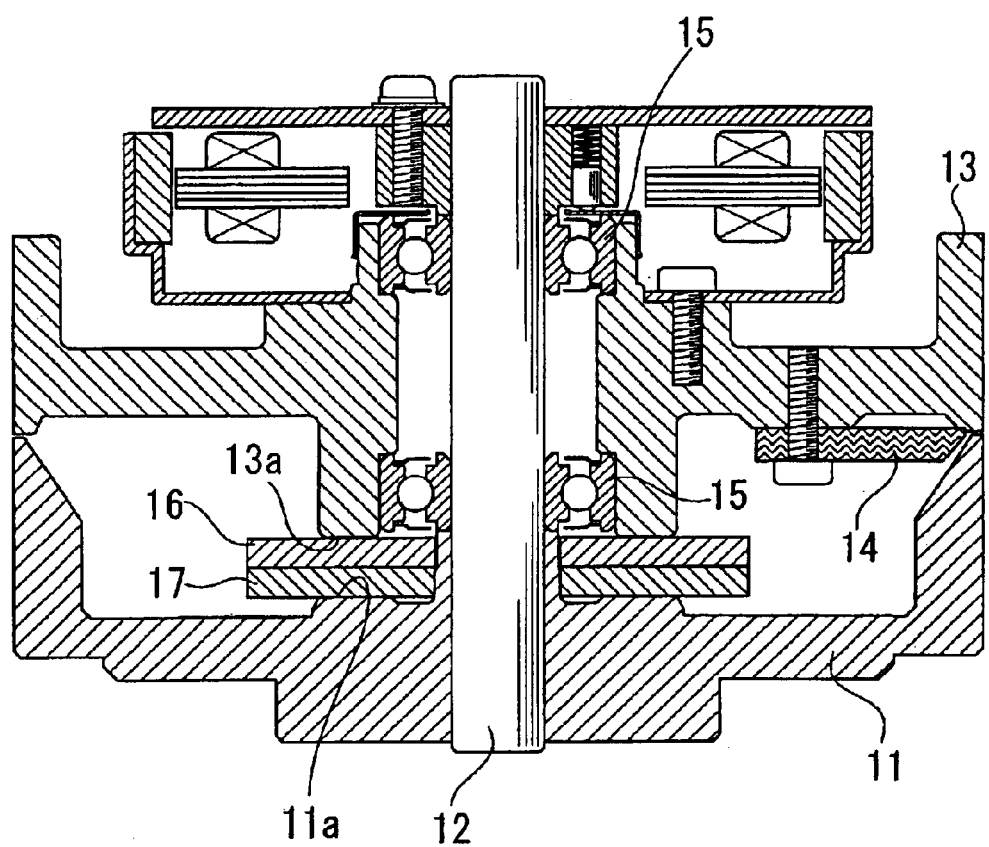
FIG. 1 is a sectional view showing a rotary head drum device according to an embodiment of the present invention.
Figure 2:
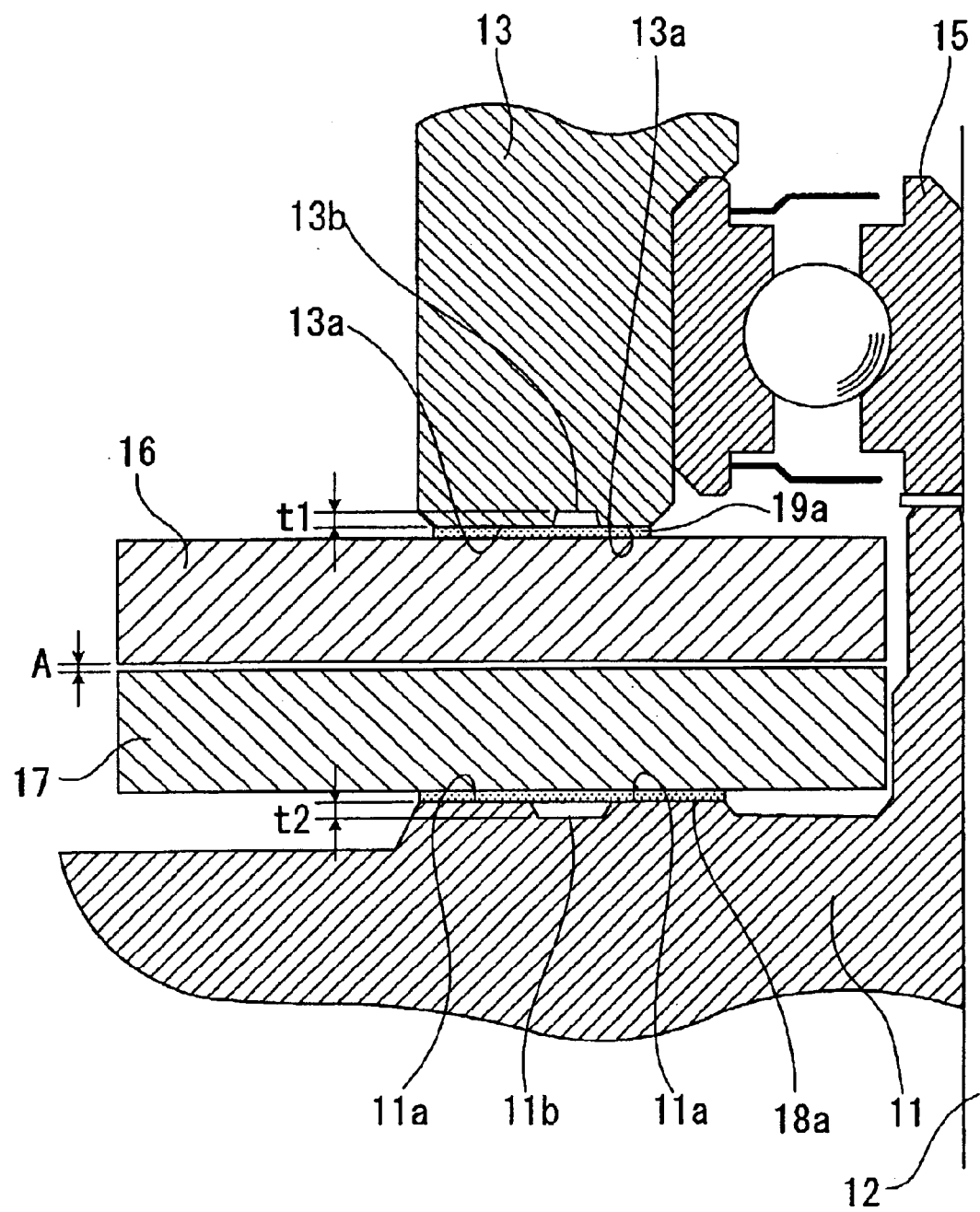
FIG. 2 is an enlarged sectional view showing a main part of the embodiment.
Figure 11:
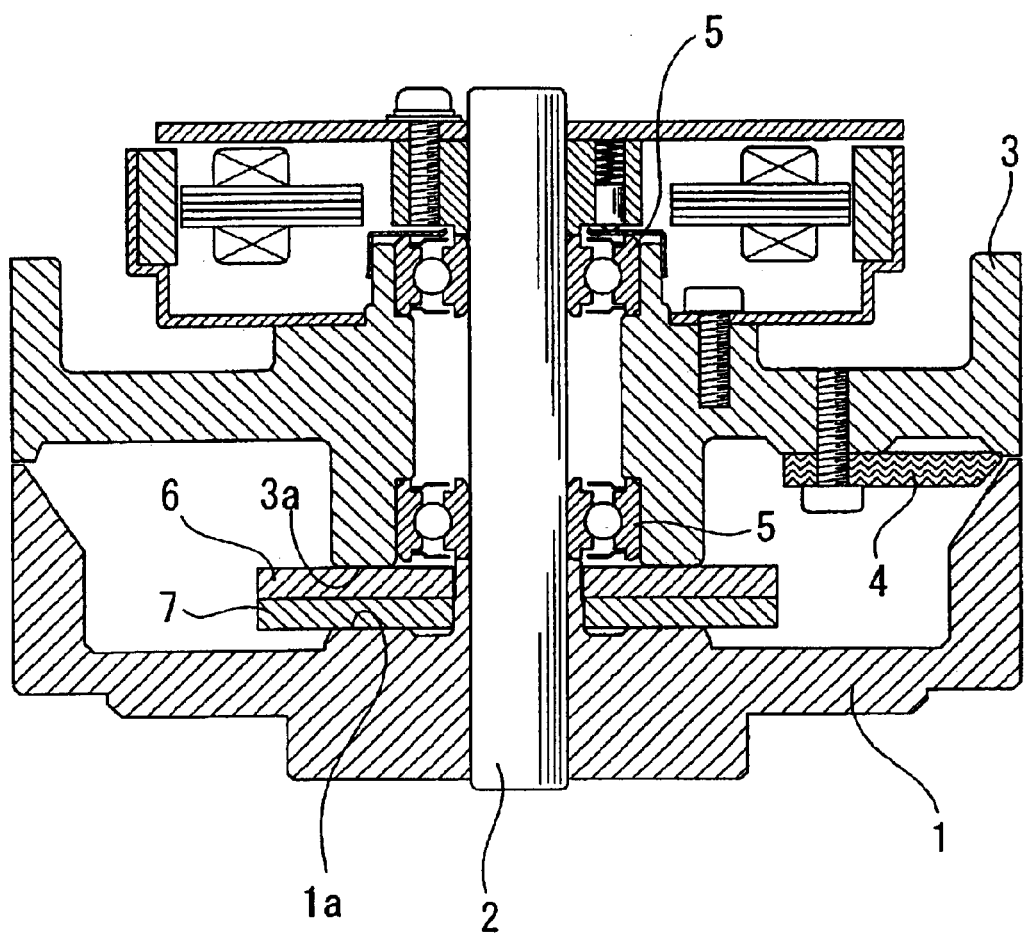
FIG. 11 is a sectional view showing a conventional rotary head drum device.
Figure 12:
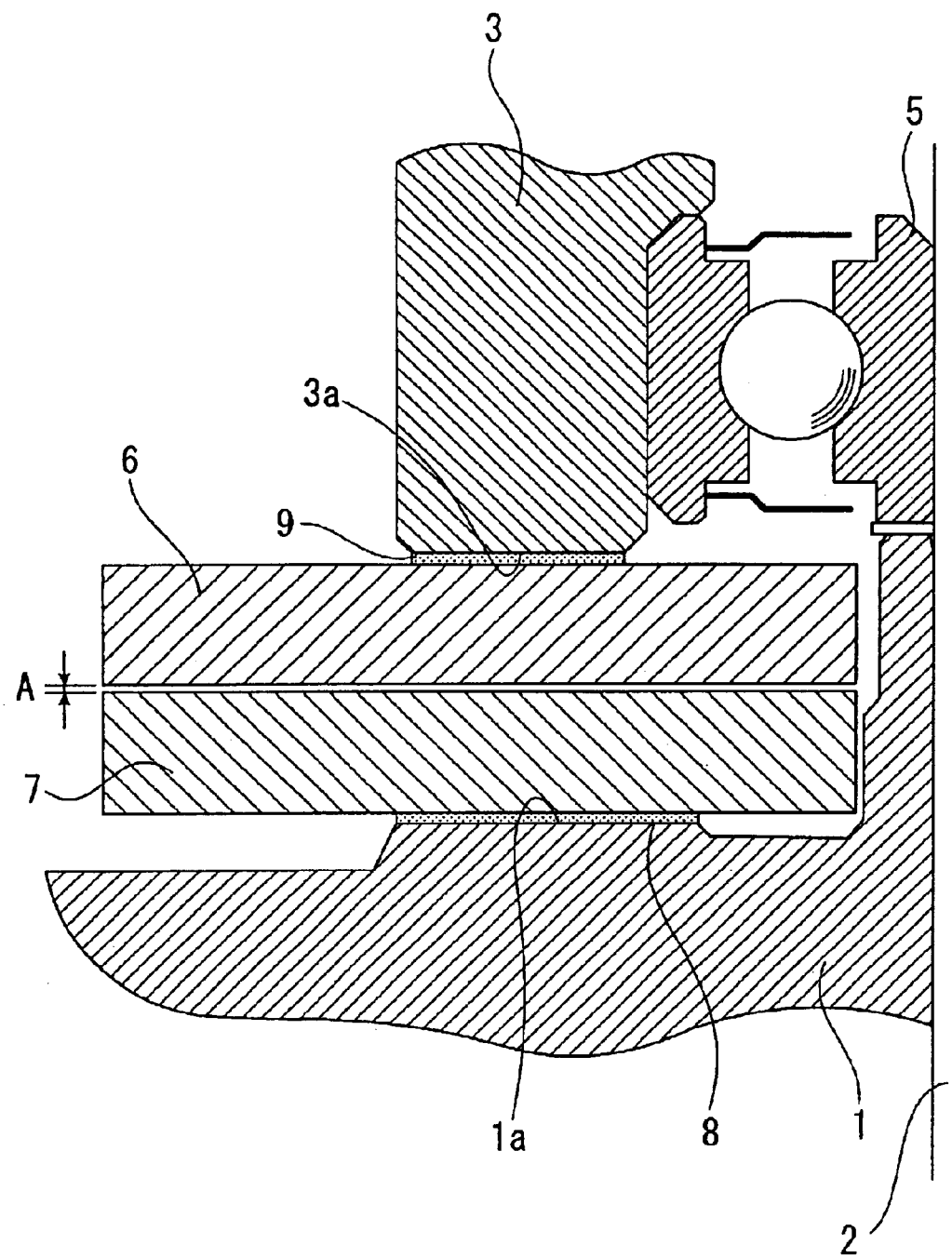
FIG. 12 is an enlarged sectional view showing a main part of the conventional art.

FIG. 1 is a sectional view showing a rotary head drum device of the present invention. Although the schematic description is the same as that of FIG. 11 showing the conventional art, ring grooves 11b and 13b are formed as hollowed portions in the configuration of a main part shown in FIG. 2, which is different from FIG. 12 showing a sectional view of the main part of the conventional art.

Reference numeral 11 denotes a fixed drum for guiding a magnetic tape (not shown), reference numeral 12 denotes a shaft which is coaxially fixed on the fixed drum 11, reference numeral 13 denotes a rotary drum having a magnetic head 14 on the lower surface, reference numeral 15 denotes ball bearings located on the upper part and the lower part of the rotary drum 13, reference numeral 16 denotes a rotation-side rotary transformer which is bonded to a lower bonded surface 13a of the rotary drum 13 via an adhesive and is electrically connected to the magnetic head 14. Reference numeral 17 denotes a fixation-side rotary transformer which is opposed to the lower surface of the rotation-side rotary transformer 16, is bonded to an upper bonded surface 11a of the fixed drum 11, and is electrically connected to an amplifying section (not shown). Reference numeral 18a denotes an adhesive layer for bonding the fixed drum 11 and the fixation-side rotary transformer 17, and reference numeral 19a denotes an adhesive layer for bonding the rotary drum 13 and the rotation-side rotary transformer 16.

At this point, in order to obtain a signal transmission characteristic between the rotation-side rotary transformer 16 and the fixation-side rotary transformer 17, a gap A formed by the lower surface of the rotation-side rotary transformer 16 and the upper surface of the fixation-side rotary transformer 17 is set as an interval of several tens µm, and a surface runout accuracy of the rotation-side rotary transformer 16 and a surface runout accuracy of the fixation side rotary transformer 17 are each set at A/2 or less. The surface runout accuracy of the rotation-side rotary transformer 16 is a parallelism of the lower surface of the rotation-side rotary transformer 16 with respect to the vertical surface on the axis of rotation of the rotary drum 13, and the surface runout accuracy of the fixation-side rotary transformer 17 is a parallelism of the upper surface of the fixation-side rotary transformer 17 with respect to the vertical surface of the axis of the shaft 12.

Figure 3:
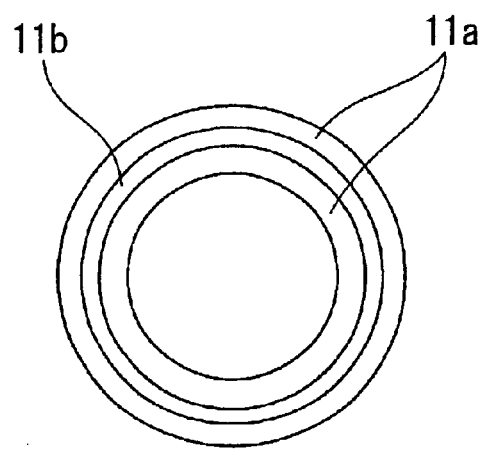
FIG. 3 is a plan view showing an upper bonded surface of a fixed drum according to the embodiment.

As shown in FIG. 3, a ring groove 11b formed as a hollowed portion is formed on the upper bonded surface 11a of the fixed drum 11. The ring groove 11b is formed on the upper bonded surface 11a so as to surround the shaft 12. The ring groove 11b is formed substantially at the center of the upper bonded surface 11a.

Figure 4:
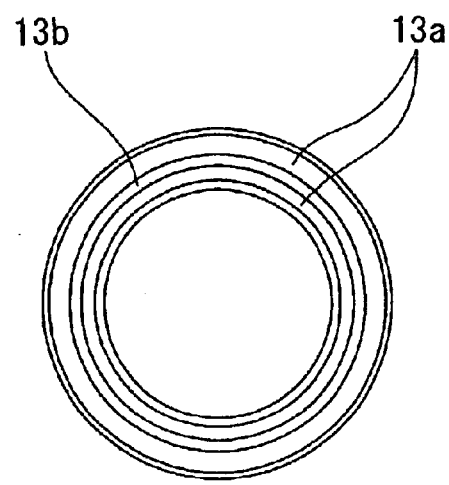
FIG. 4 is a plan view showing a lower bonded surface of a rotary drum according to the embodiment.

As shown in FIG. 4, a ring groove 13b formed as a hollowed portion is formed on the lower bonded surface 13a of the rotary drum 13. The ring groove 13b is formed on the lower bonded surface 13a so as to surround the shaft 12. The ring groove 11b is formed on the inner peripheral side of the center of the upper bonded surface 11a.

The ring grooves 11b and 13b are circumferential recessed grooves having a depth t of 0.01 to 0.1 mm. The area of the ring groove 11b is set at 10 to 40% of that, of the upper bonded surface 11a, and the area of the ring groove 13b is set at 10 to 40% of that of the lower bonded surface 13a.

The rotary head drum device is assembled as shown in FIGS. 5 to 10.

First, the magnetic head 14 is attached to the rotary head drum 13, and the ball bearings 15 are located on the upper part and the lower part of the inner surface of the bearing hole of the rotary drum 13.

Figure 5:
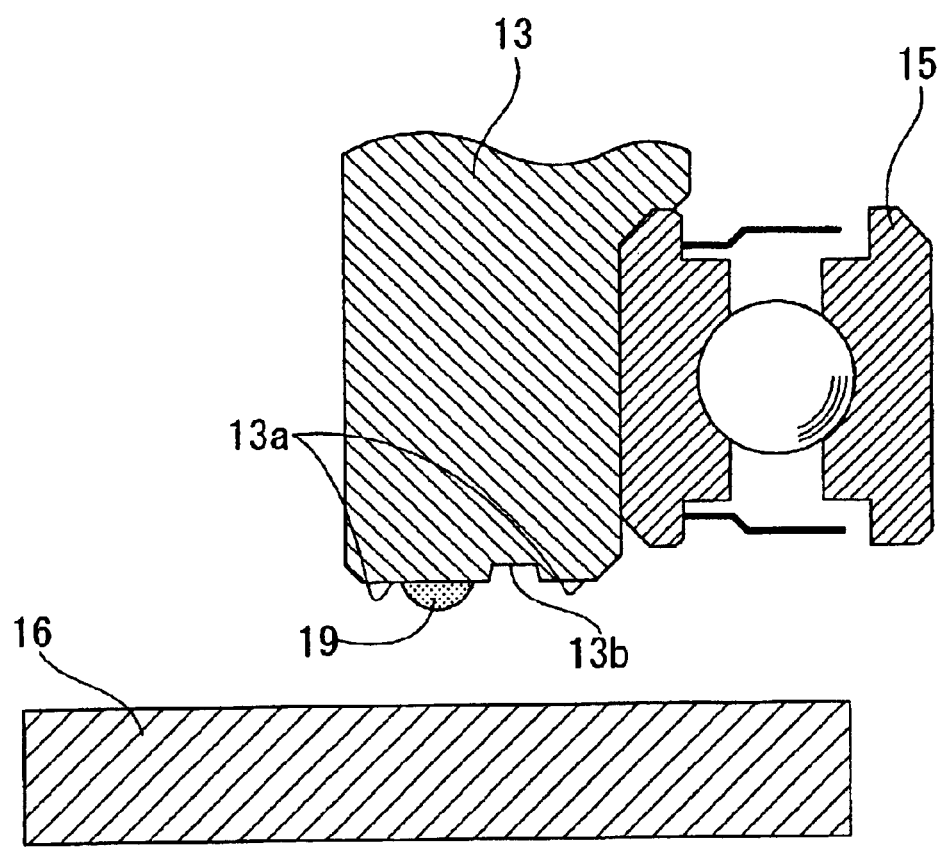
FIG. 5 is a sectional view showing a bonding process of a rotation-side rotary transformer according to the embodiment.
Figure 6:
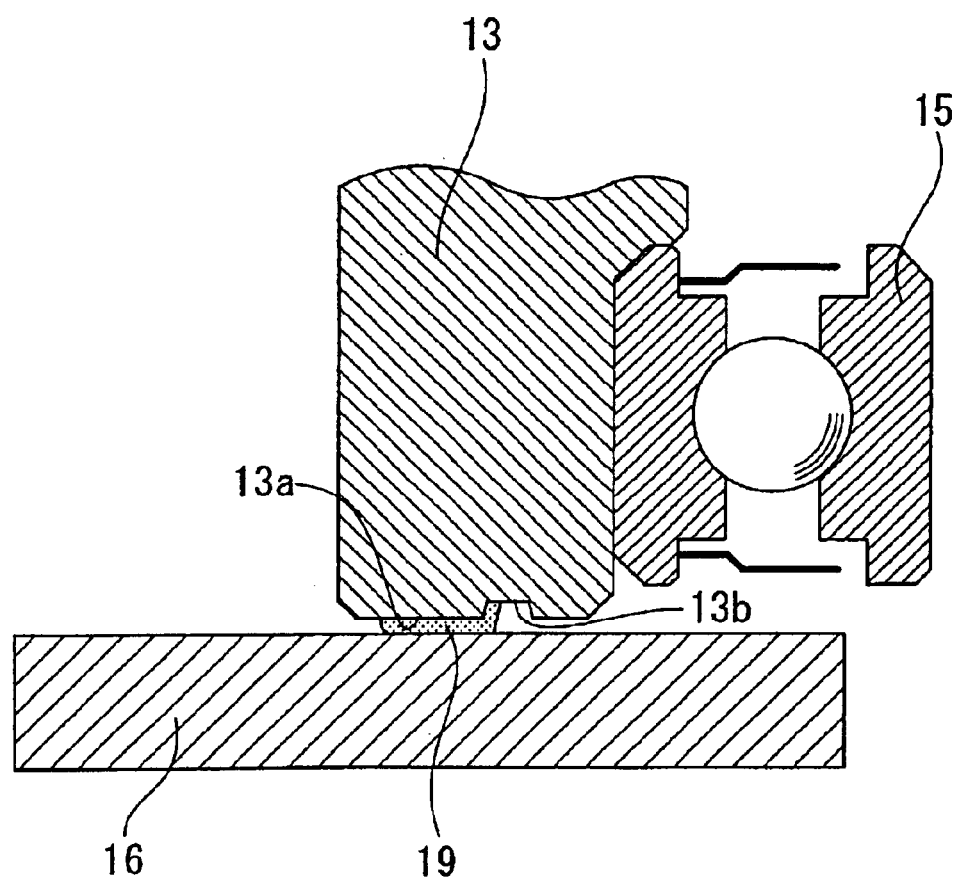
FIG. 6 is sectional view showing the bonding process of the rotation-side rotary transformer according to the embodiment.
Figure 7:
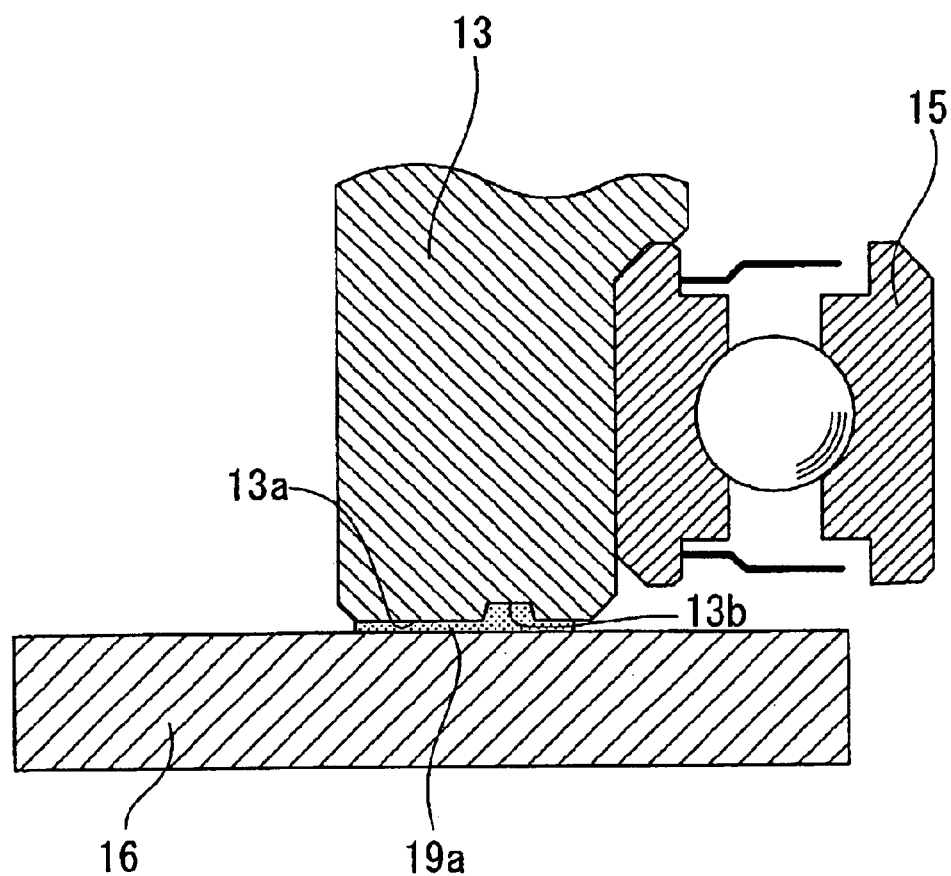
FIG. 7 is a sectional view showing the bonding process of the rotation-side rotary transformer according to the embodiment.

Next, as shown in FIG. 5, after an adhesive 19 is applied to the lower bonded surface 13a at the outer peripheral side of the ring groove 13b of the rotary drum 13, as shown in FIGS. 6 and 7, the rotation-side rotary transformer 16 is fixed by bonding with pressure.

With such an applying and press-bonding method, even when the adhesive 19 varies in amount or the applied position, since the excessive adhesive 19 flows into the ring groove 13b and is absorbed therein, the adhesive layer 19a does not vary in thickness and the adhesive 19 is less likely to spread to the inner peripheral side of the lower bonded surface 13a. Hence, the adhesive 19 hardly flows into the ball bearings 15 located on the inner peripheral side.

Figure 8:
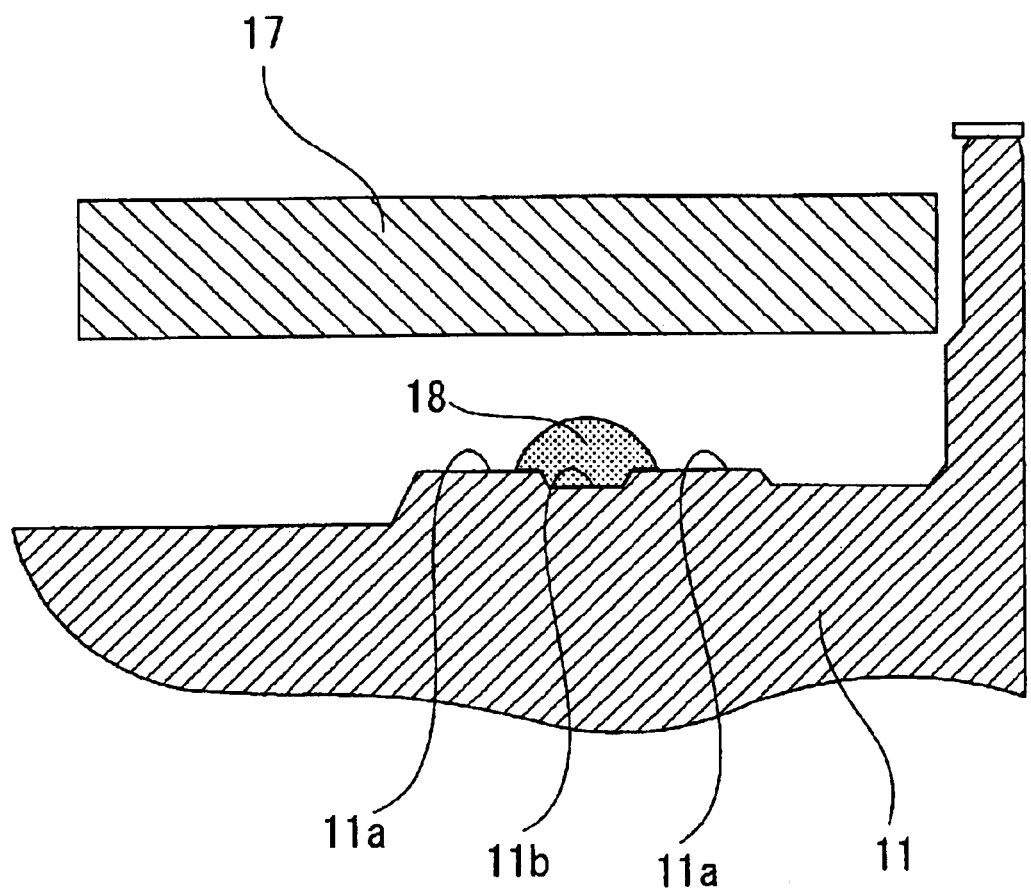
FIG. 8 is a sectional view showing a bonding process of a fixation-side rotary transformer according to the embodiment.
Figure 9:
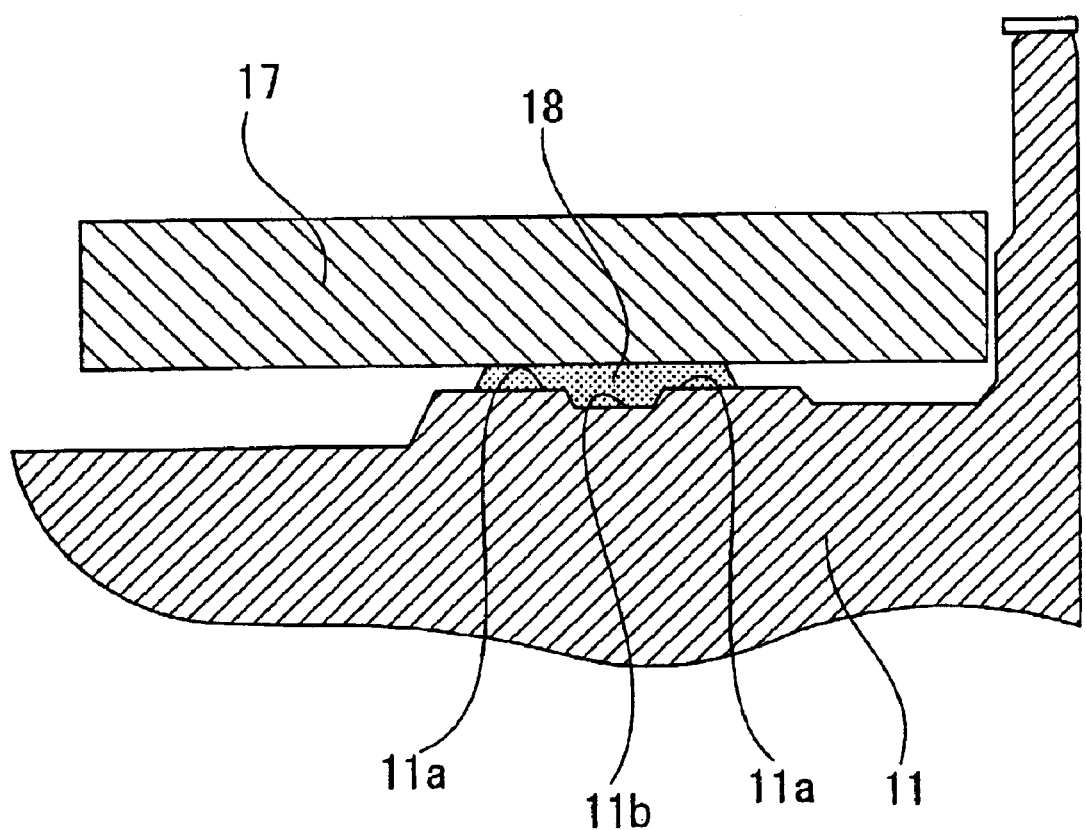
FIG. 9 is a sectional view showing the bonding process of the fixation-side rotary transformer according to the embodiment.
Figure 10:
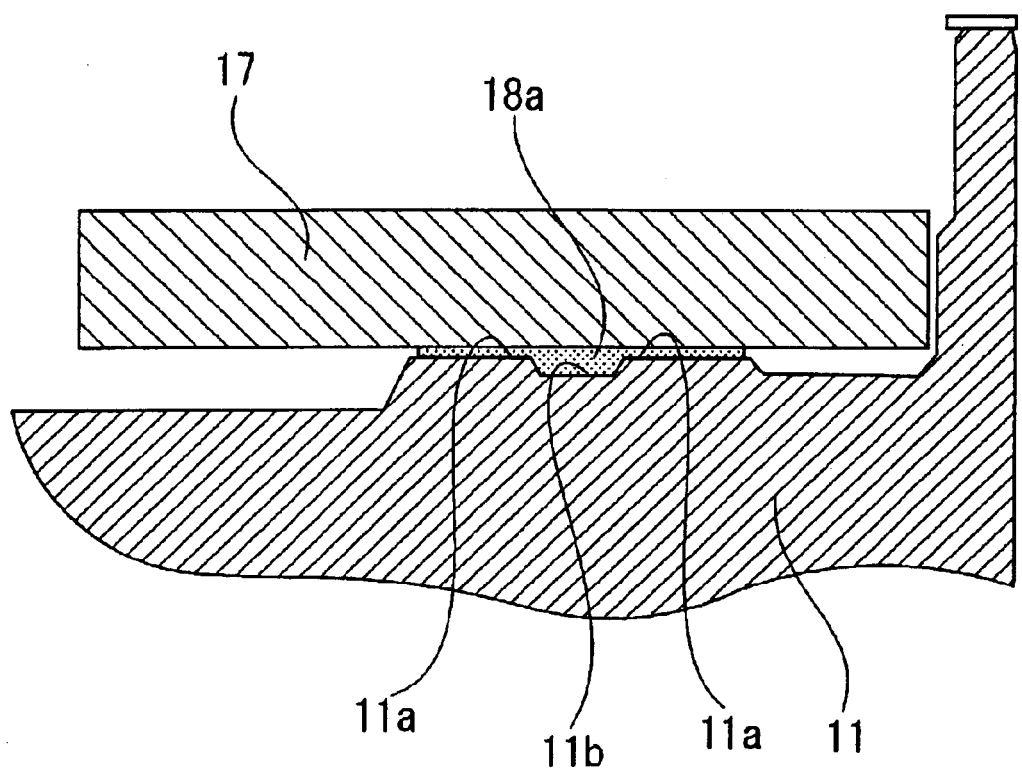
FIG. 10 is a sectional view showing the bonding process of the fixation-side rotary transformer according to the embodiment.

Further, as shown in FIG. 8, the fixation-side rotary transformer 17 is bonded to the fixed drum 11 as follows: as shown in FIG. 8, an adhesive 18 is applied to the upper bonded surface 11a while the ring groove 11b of the fixed drum 11 is located at the center, and the fixation-side rotary transformer 17 is fixed by bonding with pressure as shown in FIGS. 9 and 10.

With such an applying and bonding method, even when the adhesive 18 varies in amount or the applying position, since the excessive adhesive 18 is absorbed by the ring groove 11b, the adhesive layer 18a does not vary in thickness. Moreover, since the adhesive 18 is applied to the center of the ring groove 11b, when the fixation-side rotary transformer 17 is press-bonded, the adhesive 18 evenly spreads to the outer peripheral side and the inner peripheral side of the upper bonded surface 11a, thereby obtaining a sufficient bonded, area.

In this case, when the ring groove 11b of the fixed drum 11 has a large depth t2, the adhesive applied to the ring groove 11b does not evenly spread over the upper bonded surface 11a on the outer peripheral side and the inner peripheral side of the ring groove 11b. On the other hand, when the ring groove 11b has a small depth t2, the excessive adhesive 18 is not fully absorbed and thus the adhesive layer 18a has an uneven thickness. Preferred results were obtained by setting a depth t2 at 0.01 to 0.1 mm.

Further, when the ring groove 13b of the rotary drum 13 has a large depth t1, the lower bonded surface of the rotary drum 13 decreases in strength. On the other hand, when the ring groove 13b of the rotary drum 13 has a small depth t1, the excessive adhesive 19 is not fully absorbed and thus the adhesive layer 19a has an uneven thickness. Further, the excessive adhesive 19 flows into the ball bearing 15. As with the ring groove 11b, a depth t1 was set at 0.01 to 0.1 mm to obtain preferred results.

Besides, by setting the areas of the ring grooves 11b and 13b respectively at 10 to 40% of those of the upper bonded surface 11a of the fixed drum 11 and the lower bonded surface 13a of the rotary drum 13, preferred bonding strength is obtained between the fixed drum 11 and the fixation-side rotary transformer 17 and between the rotation-side drum 13 and the rotation-side rotary transformer 16.

Next, the shaft 12 fixed on the fixed drum 11 is inserted through the shaft holes of the ball bearings 15 provided for the rotary drum 13, the rotary drum 13 is fixed with respect to the axial direction of the shaft 12, the rotary drum 13 is mounted so as to rotate about the axis of the shaft 12, and thus the rotary head drum device is obtained.

In this way, with the ring groove 11b formed on the fixed drum 11 and the ring groove 13b formed on the rotary drum 13, even when the adhesives 18 and 19 vary in amount or the applied position, excessive adhesive is absorbed by the ring grooves 11b and 13b, and the adhesive layers 18a and 19a do not have uneven thicknesses. Thus, the surface runout accuracies of the rotation-side rotary transformer 16 and the fixation-side rotary transformer 17 can be set at A/2 or less.

Further, since the adhesive is applied to the lower bonded surface 13a on the outer peripheral side of the ring groove 13b of the rotary drum 13, excessive adhesive is absorbed by the ring groove 13b. Thus, the adhesive is less likely to spread to the inner peripheral side of the lower bonded surface 13a, so that the adhesive does not flow into the ball bearings 15 located on the inner peripheral side.

Moreover, since the position of applying the adhesive 18 to the fixed drum 11 is set at the ring groove 11b, the adhesive 18 evenly spreads over the upper bonded surface 11a on the outer peripheral side and the inner peripheral side of the ring groove 11b, thereby obtaining a sufficient bonded area.

Namely, the ring grooves 11b and 13b are formed on the fixed drum 11 and the rotary drum 13, so that the rotation-side rotary transformer 16 and the fixation-side rotary transformer 17 have stable surface runout accuracies. Thus, it is possible to obtain a rotary head drum device which can normally perform recording and reproduction.

In the above embodiment, the hollowed portions formed on the lower bonded surface of the rotary drum 13 and the upper bonded surface of the fixed drum 11 are the ring grooves 13b and 11b. The hollowed portion does not need to be a continuous single groove like the ring grooves 13b and 11b. The same effect can be expected by forming a hollowed portion having a plurality of ring grooves with different diameters, a single groove divided into two or more grooves in a circumferential direction, or a plurality of grooves having different diameters.

As described above, the present invention can achieve an excellent effect of permitting a rotary transformer to have a stable surface runout accuracy and normally performing recording and reproduction.

What is claimed is:

1. A rotary head drum device, wherein
   a rotary drum having a magnetic head attached thereon is mounted to a shaft via a ball bearing to rotate about the shaft with respect to the fixed drum, the shaft being supported by a fixed drum,
   a signal is transmitted and received to and from the magnetic head via a rotation-side rotary transformer and a fixation-side rotary transformer, the rotation-side rotary transformer being bonded and fixed on a lower bonded surface of the rotary drum, the fixation-side rotary transformer being bonded and fixed on an upper bonded surface of the fixed drum to oppose the rotation-side rotary transformer, and
   hollowed portions are formed on the lower bonded surface and the upper bonded surface.

2. The rotary head drum device according to claim 1, wherein the hollowed portions formed on the lower adhesive-surface and the upper adhesive surface are ring grooves surrounding the shaft.

3. The rotary head drum device according to claim 2, wherein the ring grooves are 0.01 to 0.1 mm in depth.

4. The rotary head drum device according to claim 2, wherein the ring groove formed on the rotary drum has an area set at 10 to 40% of that of the lower bonded surface, and the ring groove formed on the fixed drum has an area set at 10 to 40% of that of the upper bonded surface.

5. A method of manufacturing a rotary head drum device, in which a rotary drum having a magnetic head attached thereon is mounted to a shaft via a ball bearing to rotate about the shaft with respect to the fixed drum, the shaft being supported by a fixed drum, and a signal is transmitted and received to and from the magnetic head via a rotation-side rotary transformer and a fixation-side rotary transformer, the rotation-side rotary transformer being bonded and fixed on a lower bonded surface of the rotary drum, the fixation-side rotary transformer being bonded and fixed on an upper bonded surface of the fixed drum to oppose the rotation-side rotary transformer,
   wherein when an adhesive is applied to the rotary drum, the adhesive is applied to an outer peripheral side of a hollowed portion formed on the lower bonded surface of the rotary drum, and then, the rotation-side rotary transformer is press-bonded to the rotation drum.

6. A method of manufacturing a rotary head drum device configured so that a rotary drum having a magnetic head attached thereon is mounted to a shaft via a ball bearing so as to rotate about the shaft with respect to the fixed drum, the shaft being supported by a fixed drum, and a signal is transmitted and received to and from the magnetic head via a rotation-side rotary transformer and a fixation-side rotary transformer, the rotation-side rotary transformer being bonded and fixed on a lower bonded surface of the rotary drum, the fixation-side rotary transformer being bonded and fixed on an upper bonded surface of the fixed drum to oppose the rotation-side rotary transformer,
   wherein when an adhesive is applied to the fixed drum, the adhesive is applied to a hollowed portion formed substantially at the center of the upper bonded surface of the fixed drum, and then, the fixation-side rotary transformer is press-bonded to the fixed drum.

* * * * *